CONVERSION TABLE
CABLE CODE TO 5-UNIT CODE

| CABLE CODE | LETTER CASE | | FIGURE CASE | |
|---|---|---|---|---|
| | CHARACTER | 5-UNIT CODE | CHARACTER | 5-UNIT CODE |
| | | | | |
| • | E | + − − − − | 5 | − − − − + |
| — | T | − − − − + | 0 | − + + − + |
| | | | | |
| • • | I | − + + − − | | |
| — • | N | − − + + − | 9 | − − − + + |
| • — | A | + + − − − | 1 | + + + − + |
| — — | M | − − + + + | | |
| | | | | |
| • • • | S | + − + − − | | |
| — • • | D | + − − + − | 8 | − + + − − |
| • — • | R | − + − + − | | |
| — — • | G | − + − + + | \ | |
| • • — | U | + + + − − | 2 | + + − − + |
| — • — | K | + + + + − | | |
| • — — | W | + + − − + | | |
| — — — | O | − − − + + | | |
| | | | | |
| • • • • | H | − − + − + | 4 | − + − + − |
| — • • • | B | + − − + + | 6 | + − + − + |
| • — • • | L | − + − − + | ) | − + − − + |
| — — • • | Z | + − − − + | 7 | + + + − − |
| • • — • | F | + − + + − | / | + + − + − |
| — • — • | C | − + + + − | - | + + − − − |
| • — — • | P | − + + − + | , | − − + + − |
| — — — • | SPACE | − − + − − | LTRS. | + + + + + |
| • • • — | V | − + + + + | 3 | + − − − − |
| — • • — | X | + − + + + | / | + − + + + |
| • — • — | END OF MSGE. | − + − − − | END OF MSGE. | − + − − − |
| — — • — | Q | + + + − + | ( | + + + + − |
| • • — — | FIGS. | + + − + + | FIGS. | + + − + + |
| — • — — | Y | + − + − + | . | − − + + + |
| • — — — | J | + + − + − | | |
| — — — — | END OF LINE | − − − + − | END OF LINE | − − − + − |

FIG. 1

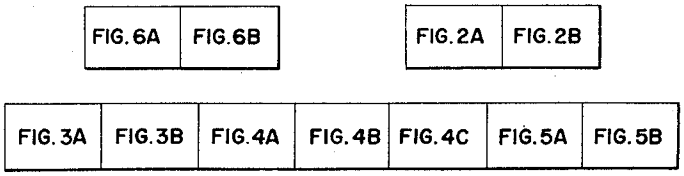

FIG. 7

INVENTORS
B. S. DIAMOND
J. B. WALKER
BY Robert Harding Jr.
ATTORNEY

Aug. 12, 1958 B. S. DIAMOND ET AL 2,847,503

TELEGRAPH CODE CONVERTER

Filed Dec. 29, 1954 12 Sheets-Sheet 3

INVENTORS
B.S. DIAMOND
J.B. WALKER
BY Robert Harding Jr.
ATTORNEY

Aug. 12, 1958 B. S. DIAMOND ET AL 2,847,503

TELEGRAPH CODE CONVERTER

Filed Dec. 29, 1954 12 Sheets-Sheet 5

Aug. 12, 1958 B. S. DIAMOND ET AL 2,847,503

TELEGRAPH CODE CONVERTER

Filed Dec. 29, 1954 12 Sheets-Sheet 8

Aug. 12, 1958 B. S. DIAMOND ET AL 2,847,503

TELEGRAPH CODE CONVERTER

Filed Dec. 29, 1954 12 Sheets-Sheet 11

INVENTORS
B.S. DIAMOND
J.B. WALKER

[signature]

ATTORNEY

Aug. 12, 1958

B. S. DIAMOND ET AL 2,847,503

TELEGRAPH CODE CONVERTER

Filed Dec. 29, 1954

12 Sheets-Sheet 12

INVENTORS
B.S. DIAMOND
J.B. WALKER
BY Robert Harding Jr.
ATTORNEY

United States Patent Office 2,847,503

Patented Aug. 12, 1958

2,847,503

TELEGRAPH CODE CONVERTER

Bertram Stentaford Diamond, Madison, N. J., and John Baldwin Walker, New Canaan, Conn., assignors to The Commercial Cable Company, New York, N. Y., a corporation of New York Application December 29, 1954, Serial No. 478,312

16 Claims. (Cl. 178—26)

This invention relates to improvements in telegraph receiving apparatus and more particularly to an arrangement for receiving signals as elements of one transmission code and converting said signals to elements of a different transmission code.

The code converter according to the invention comprises a device for converting by electronic means signals from a code of arbitrary nature into one or more other codes of another arbitrary nature.

The prior art discloses devices for converting received signals from one code to another but such devices were essentially mechanical or electromagnetic in nature and required a great number of relays and distributors which rendered the equipment costly. The present invention utilizes electronic responsive elements and a small number of relays and dispenses with any mechanical distributors.

Accordingly, the system disclosed is capable of receiving signals as elements of one transmission code to be converted into elements of a different transmission code suitable for punching a tape or storage, or retransmission, character by character. In the embodiment to be described conversion was made from Cable Code to Baudot code which consists of impulses in the time frame of five units. It is to be understood that translation may be from any other code to any different code and the example illustrated is non-limitative. The Cable Code is a three-element code, embodying positive current impulses to represent dots, negative current impulses of equal duration to represent dashes, and periods of no current to represent spaces or intervals. In the printing telegraph art the Baudot code is used and the code combinations corresponding to each character consist of the same number of elements, any one of which can be a "mark" or a "space"; the same number of marks and spaces being utilized for each character, the difference between characters being represented by the different permutations or placement of the mark and space signals with respect to the others.

Accordingly, it is an object of the invention to provide an improved apparatus for changing received telegraph signals from one code to another code, character by character.

It is a further object of the invention to provide improved apparatus for automatically changing signals from cable code to Baudot code, character by character.

Another object of the invention is to produce perforated telegraphic printed code tape in one code elements of uniform time duration from another code having elements of non-uniform time duration.

This invention will be particularly described with reference to an embodiment shown in the accompanying drawing in which:

Fig. 1 is a conversion table showing the necessary conversion from the Cable Code to the Baudot code;

Fig. 7 is a sketch showing how the several foregoing figures be juxtaposed to enable ready understanding of the invention and the operation thereof.

Figure 2A:
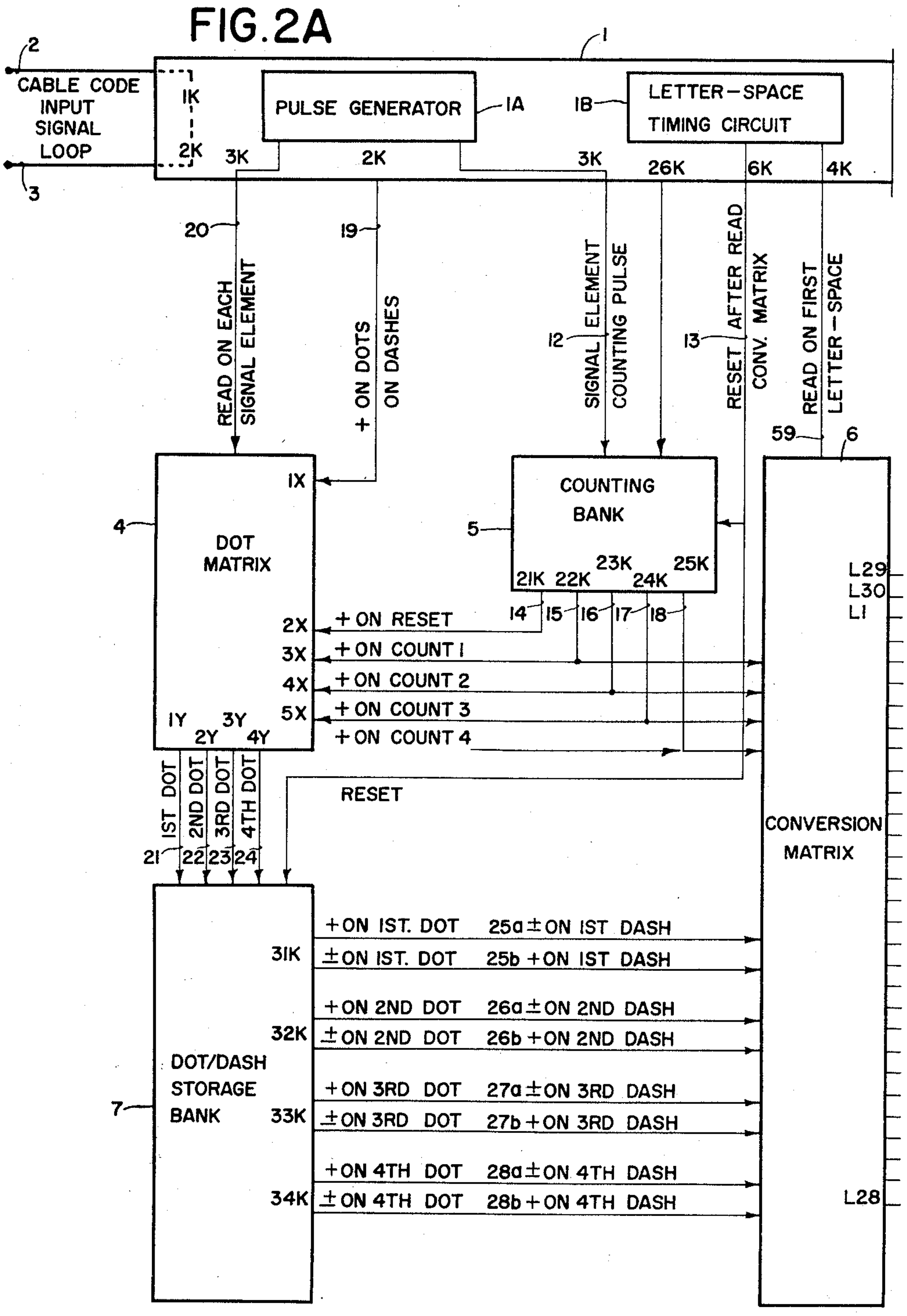
Fig. 2A is a block diagram of a first portion of our novel code converter.
Figure 2B:
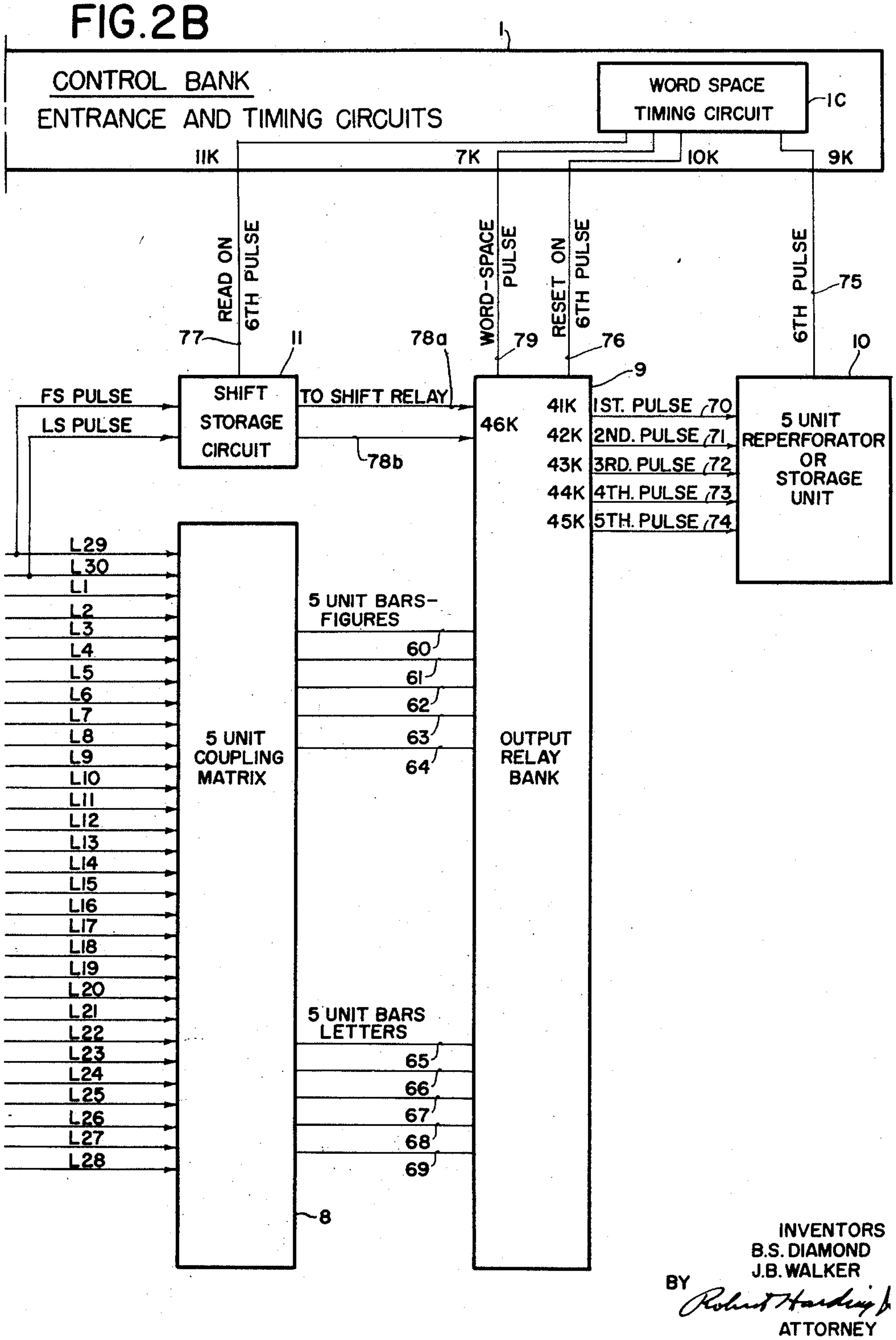
Fig. 2B is a block diagram of the other portion of our novel code converter.

Referring now to Figs. 2A and 2B, it will be observed that my improved code converter consists of a Control Bank 1, having input terminals 2 and 3 to which the incoming code is applied, a Dot Matrix 4 for combining signals from a Counting Bank 5 with information received from Control Bank 1. There is also provided a Conversion Matrix 6 which combines the count received from the Counting Bank 5 with accumulated dot-vs.-dash information impressed by the Dot/Dash Storage Bank 7. The Storage Bank 7 is coupled to the Dot Matrix 4 so as to accumulate the dot-vs.-dash information as received from the Dot Matrix 4.

The Conversion Matrix 6 is coupled to a Coupling Matrix 8 which translates the signals received from the Conversion Matrix 6 into code pulses of the new code into which it is desired to translate the code received by the Control Bank 1, and in the embodiment chosen for illustration, the Coupling Matrix will translate into 5-Unit code, Cable code signals received from the Conversion Matrix 6. The translated signals now in the new code form are fed to an Output Relay Bank whose function it is to convert the new code signals into output pulses capable of driving selector magnets of a tape reperforator or Storage Unit 10. The Shift Storage Circuit 11 controls the Output Relay Bank 9 with respect to "letter shift" of "figure shift" in accordance with pulses received from the Conversion Matrix 6 under control of a reading pulse derived from the Control Bank 1. As is well known to those skilled in the telegraphy art, these shift signals are necessary to control the printing function of a printing telegraph receiver which will be used to eventually record the received intelligence.

Considering now the contents of the several blocks in Figs. 2A and 2B, it will be seen that the Control Bank 1 is further subdivided into a Pulse Generator 1A, a Letter-Space-Timing Circuit 1B and a Word-Space Timing Circuit 1C. The received cable code signals are applied to two serially connected input relays shown simply as 1K and 2K and which relays respond to received dots and dashes respectively in Cable Code. It will be observed that the relays 1K . . . 4K, indicated by their reference numerals only, 6K, 7K and relays 9K . . . 11K, are contained within Control Bank 1. The cable code is applied to relays 1K and 2K over input terminals 2 and 3. The Control Bank is provided with connections to the Dot Matrix 4, Counting Bank 5, Conversion Matrix 6, Shift Storage Circuit 11, Output Relay Bank 9 and the Re-Perforator or Storage Unit 10. The Dot-Matrix 4 is coupled to the Dot-Dash Storage Bank 7 and to the Conversion Matrix 6. The Dot-Dash Storage Bank 7 is coupled to the Conversion Matrix 6, and the Conversion Matrix 6 in turn is coupled to the Shift Storage Circuit 11 and to the Five-Unit Coupling Matrix 8. The Five-Unit Coupling Matrix 8 is coupled to the Output Relay Bank 9, and the Output Relay Bank 9 in turn is coupled to the Re-Perforator or Storage Unit 10.

Figure 6A:
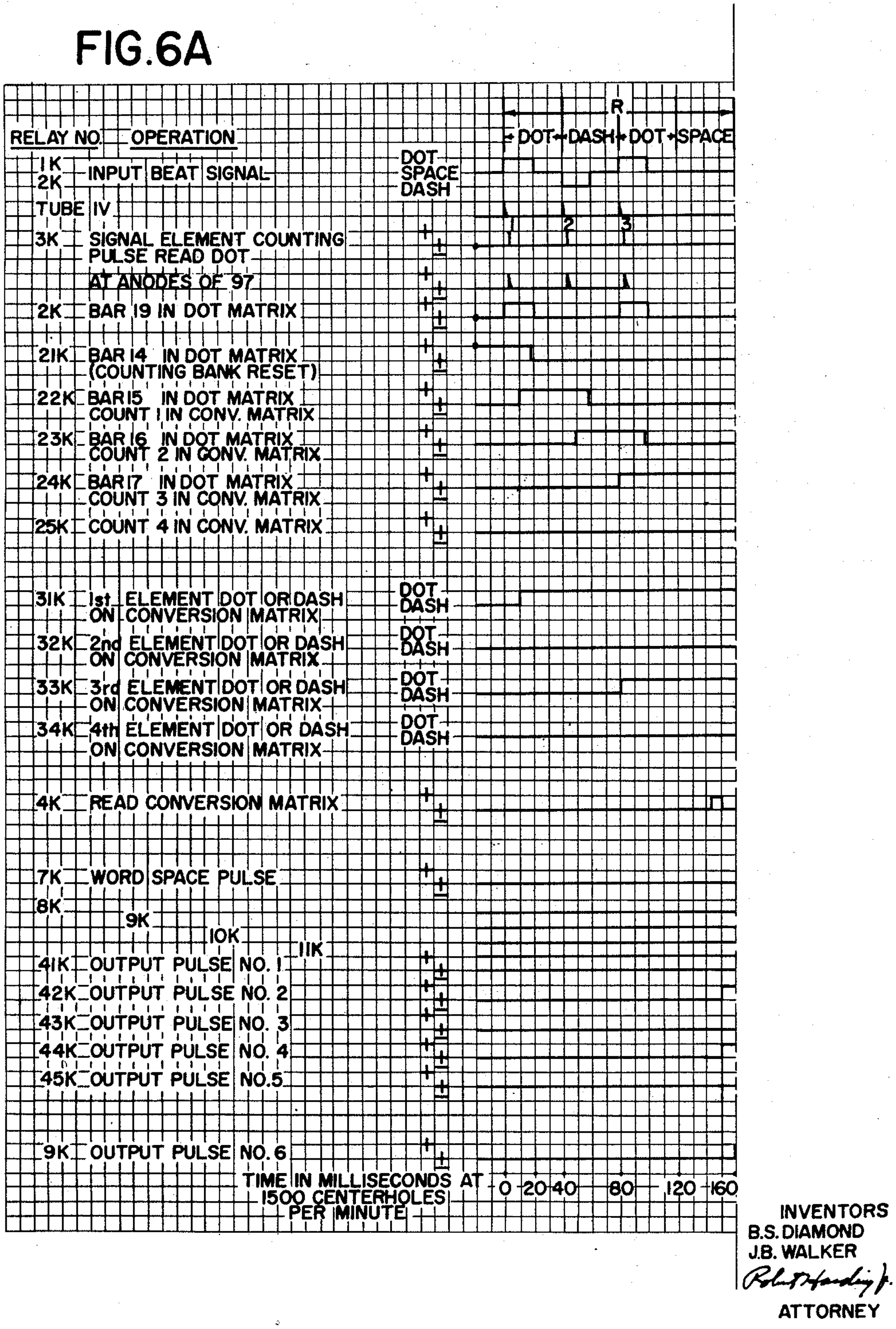
Fig. 6A is a first half of a timing chart showing the operation of the apparatus shown in Figs. 3A, 3B, 4A, 4B, 5A and 5B.
Figure 6B:
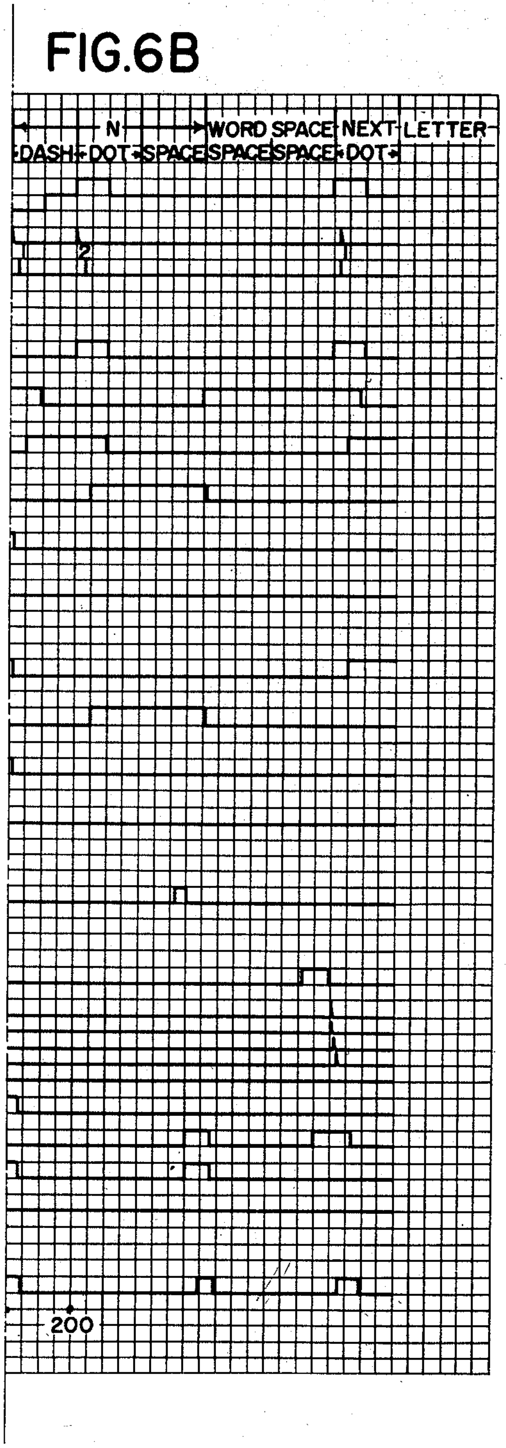
Fig. 6B is the other half of the timing chart of Fig. 6A.

The control Bank 1 receives the cable signals through the input signal loop, driving the dot-relay 1K or the dash-relay 2K, depending on the character of the received element. Pulse generating circuit 1A located in this bank then generates pulses which energize the Counting Bank 5, the Dot Matrix 4, the Conversion Matrix 6, the Five-Unit Coupling Matrix 8, the Shift Storage Circuit 11, the output Relay Bank 9 and the Re-Perforator or Storage Unit 10. The operation of the several elements controlled by the Control Bank may be readily followed from Figs. 6A and 6B which is a time sequential chart.

The Counting Bank 5 receives a counting pulse from the Control Bank via lead 12 on each received signal element (dot or dash). After the first letter space the Letter-Space Timing Circuit 1B sends a re-set pulse via lead 13 to return the Counting Bank to its initial position. In the initial position, output lead 14 of the group of five output leads 14 . . . 18 of the Counting Bank is at positive and the leads 15 . . . 18 are neutral. On receiving the first counting pulse, lead 15 is raised to positive and lead 14 returns to its neutral state. Upon the receipt of the second counting pulse from the Control Bank 1, lead 16 is raised to positive and lead 15 returns to neutral. In similar fashion, the third and fourth signal elements are recorded.

The Dot Matrix 4 combines counting signals from the Counting Bank 5 with dot-vs-dash information received from the Control Bank via lead 19. On each signal element after these two types of information have been received, a read pulse is applied via lead 20 from the Control Bank 1 to the Dot Matrix 4. If the first element is a dot, the read pulse finds an exit from the matrix along the output lead 21, but if the first element is a dash, the read pulse is absorbed in neutral in the Dot Matrix since lead 19 is set at neutral during the period of reception of a dash and consequently no output signal will appear from the Dot Matrix 4. The second output lead 22, will be energized or not, depending upon whether or not the second signal element is a dot. The outputs for the third and fourth dots are derived in similar fashion.

The Dot-Dash Storage Bank 7 accumulates information received over the leads 21 . . . 24 until all the elements of the character have been received. The accumulated information as to the dot-vs-dash nature of the received successive Cable Code signal elements is applied from the Dot-Dash Storage Bank 7 to four pairs of output leads **25*a*, 25*b*, 26*a*, 26*b*, 27*a*, 27*b*, 28*a*, and 28*b*, which impress such information in the form of potentials on the Conversion Matrix 6. Shortly after generating the first letter-space pulse, the Control Bank 1 sends a re-set pulse via lead 13 to re-set the Counting Bank 5 to its "zero" condition. At this point, each of the four possible Cable Code signal elements is registered by the output lead potentials as a dash and this condition will continue until a new dot signal is received from the Dot Matrix 4**.

The Conversion Matrix 6 combines the final count of the completed Cable Code character impressed by the Counting Bank 5 with the accumulated dot-vs-dash information impressed by the Dot/Dash Storage Bank 7. This total information can yield up to thirty combinations or patterns of potentials on the Conversion Matrix 6 which potentials appear on the output leads L1 . . . L30, corresponding to thirty different characteristics. The first letter-space pulse arriving at the Conversion Matrix 6 via lead 59 from the Letter Space Timing Circuit 1B constitutes the "read" pulse which "reads" the existing final Conversion Matrix potential. The "read" pulse will always find an exit along some one of the thirty output leads L1 . . . L30, to which a positive potential will have been applied from the Dot/Dash Storage Bank 7. The other 29 outputs will have been set at neutral and the "read" pulse will be absorbed in neutral thereon and will not pass to the Coupling Matrix 8. Thus, the incoming three-element Cable Code character has been reduced to a single positive pulse and routed to a particular output terminal L1 . . . L30 which is energized by that character alone. The output leads L1 . . . L30 are fed to the Five-Unit Coupling Matrix 8 and, in addition, leads L29 and L30 are coupled to the Shift Circuit 7 to control operation of the Shift Storage Circuit from "figure" shift to "letter" shift, or vice versa dependent upon the received function signal in Cable Code which precedes letter or figure shift.

The Coupling Matrix 8 translates any of the possible thirty output signals received from the Conversion Matrix into five-unit, or Baudot code pulses. Each of the possible thirty signal outputs is coupled to the proper selection of five-unit leads 60 . . . 64 for figures, and output leads 65 . . . 69 for letters via a network of gaseous discharge devices **193*a* . . . 202*o* which may be neon lamps, for instance as shown in Fig. 4B. The conversion permutations may be understood by referring to Figure 1 containing the Code Conversion Table. Both of the sets of the five-unit leads 60 . . . 64 and 65 . . . 69 are coupled to the Output Relay Bank 9 which converts the output signals received from the Coupling Matrix 8 into output relay pulses to drive the selector magnets of the Five-Unit RePerforator or Storage Unit 10 via leads 70 . . . 74. It will be understood that any preferred type of storage may be used and, in addition, a printing telegraph transmitter or receiver may be actuated thereby without the intervention of a storage or reperforator unit. Each of the leads 70 . . . 74 controls the operation of perforating fingers which are prepared for operation by the pulses received over leads 70 . . . 74 and which upon receipt of a sixth pulse from the Letter-Space Timing Circuit 1B, or the Word-Space Timing Circuit 1C, via lead 75, are actuated by means of a punch magnet 75*a* (Fig. 5B) contained in the Re-Perforator Unit 10. The relays contained in the Output Relay Bank 9 are reset to their inoperative position shortly after the sixth pulse via lead 76 (Fig. 2B). The sixth pulse through operation of relay 11K removes neutral from the Shift Storage Circuit 11 via lead 77 which sets the Output Relay Bank 9 to either the "letter" shift or "figure" shift position over either lead 78*a* or 78*b* depending upon whether leads L29 or L30 are energized, and which leads extend from the Conversion Matrix 6, as previously explained. When the Output Relay Bank 9 is in either the "letter" shift or "figure" shift position, it responds to letter or figure signals, as the case may be. A pulse is applied to the Output Relay Bank 9 via lead 79 at the conclusion of the reception of all the Cable Code elements constituting a letter or a word, at which time the pulse actuates the selector-magnet 221** (Fig. 5B) corresponding to the third or middle element of the code permutation representing "space" in the Baudot code, as can be seen from an examination of Figure 1.

The Shift Storage Circuit 11, stores the "letter" shift or "figure" shift signal received from the Conversion Matrix 6, as above stated, and stores it while the same signal is applied through the Coupling Matrix 8 via leads L29 and L30 and in response to which the Output Relay Bank 9 generates output pulses over the leads 70 . . . 74. The application of the sixth pulse over lead 77 from the Control Bank 1 causes the Shift Storage Circuit 11 to set the Output Relay Bank 9 in the desired shift position via the leads 78*a*, 78*b* and in condition for the receipt of the next character. A detailed description of the structure of our invention and the operation thereof will now be given.

Figure 3A:
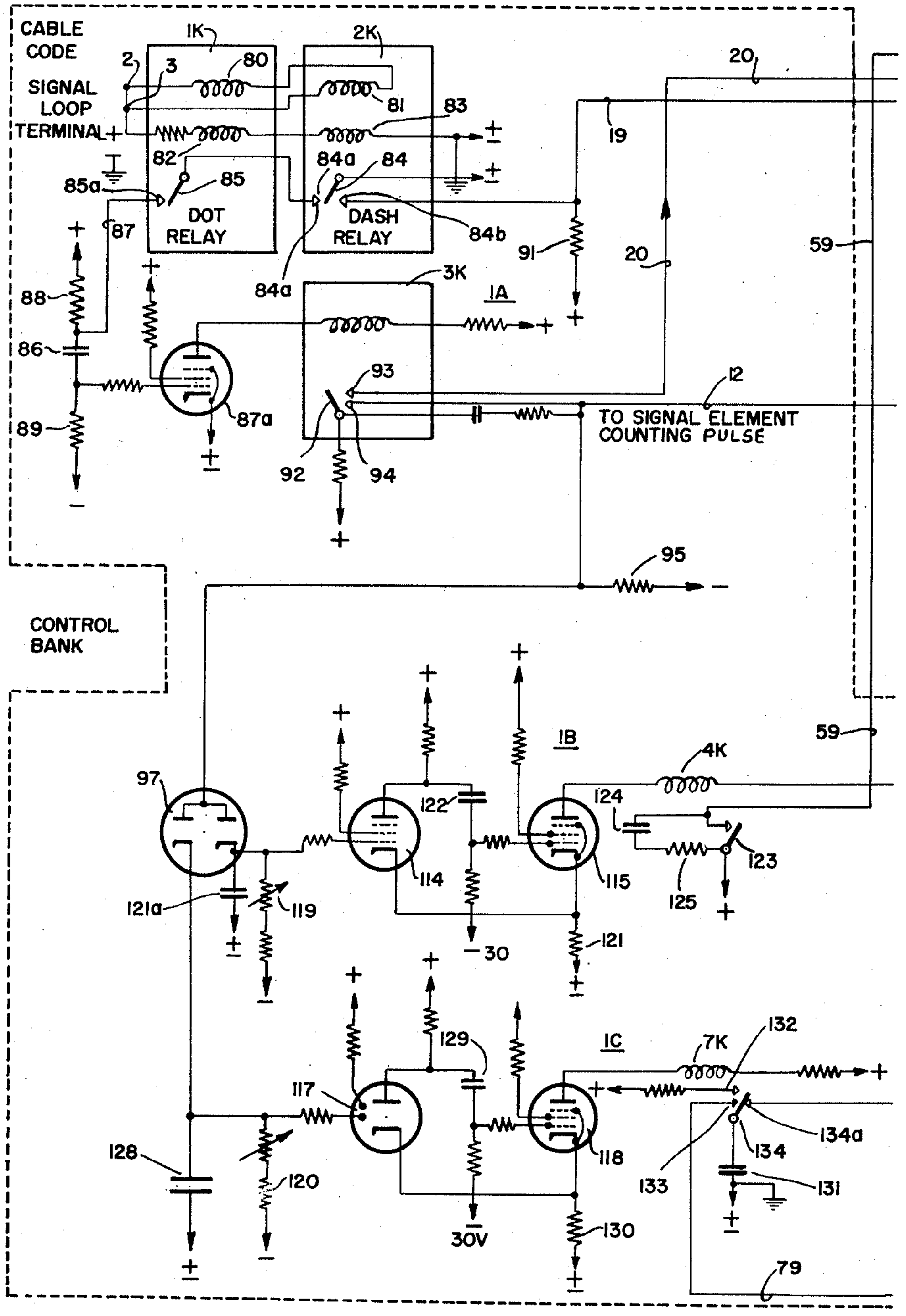
Fig. 3A is a schematic circuit diagram of a first portion of the Control Bank of Fig. 2A.

Please now refer to Figs. 3A, 3B, 4A, 4B, 4C, 5A and 5B which are to be aligned in accordance with the showing in Fig. 7. In Figs. 3A . . . 5B neutral is indicated ± and a negative potentional is indicated —.

*The control bank 1*

Figure 3B:
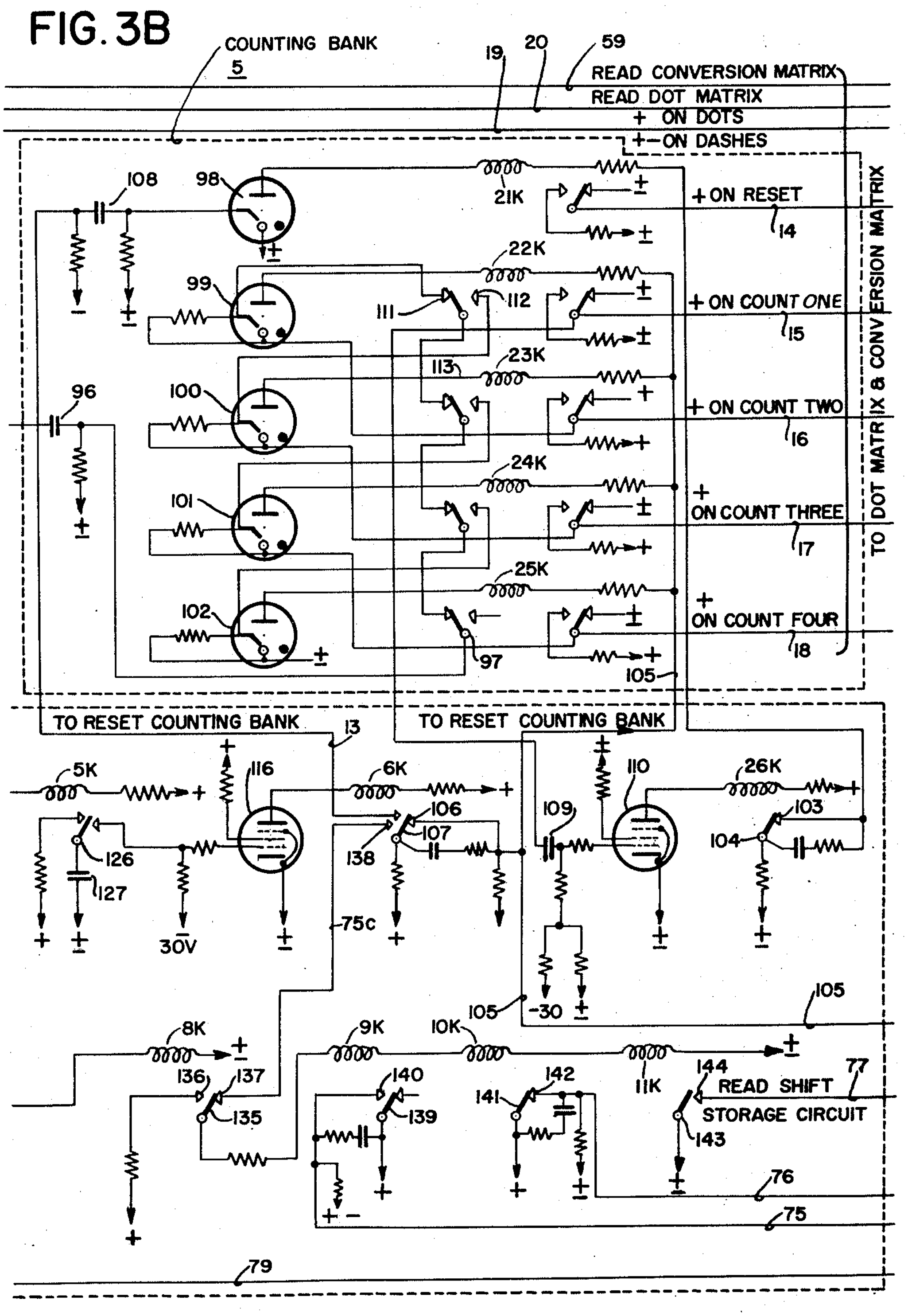
Fig. 3B is a schematic circuit diagram of a second portion of the Control Bank and the Counting Bank of Fig. 2A.

The Control Bank 1 shown in detail on Figs. 3A and 3B, consists of dot relay 1K and dash relay 2K. Relays 1K and 2K are provided with main windings 80 and 81, respectively, and with biasing windings 82 and 83, respectively; the windings of each relay serially connected with the corresponding winding of the other relay. It will be observed however, that the main winding 81 of the relay 2K is connected in opposition to the main winding 80 of the relay 1K; both windings 80 and 81 being serially connected to the input signal loop terminals 2 and 3. Steady biasing potential is applied through the serially connected biasing windings 82 and 83. Upon the application of a positive current impulse to the input terminals 2 and 3 (representing a received dot in Cable Code), dot-relay 1K will operate since the magnetic flux generated by the main winding 80 flows in the opposite direction to the flux generated by the biasing winding 82, due to the reversed winding of relay 2K, which is the dash relay, a received dot will not cause the relay to operate since the flux developed by the main winding 81 is in the same direction as that developed by the biasing winding 83 and, therefore, the dash relay will not respond to a dot. If however, a negative potential is applied to the signal input terminls 2, 3 (representing a received dash in the Cable Code), relay 2K will operate while relay 1K will remain unoperated. The tongue 84 of the dash relay is connected to neutral and the tongue 85 of the dot relay is connected to back contact 84*a* associated with tongue 84 of the dash relay. The back contact 85*a* associated with tongue 85 of the dot relay is connected to one terminal of a condenser 86 by means of conductor 87 so that in the condition shown in the drawing, neutral potential is applied to the upper electrode of condenser 86. Condenser 86 is coupled to the control electrode of electron discharge device 87*a* and the condenser 86 is serially connected in a voltage divider circuit constituted by resistances 88 and 89 across a potential source +, —. Negative potential is normally applied via resistance 89 to the control electrode of tube 87*a* maintaining it normally non-conducting. The positive potential which is connected to the upper terminal of resistance 88 cannot charge condenser 86 as long as neutral is applied to lead 87 and will have no effect on the control electrode of tube 87*a* until the neutral is removed from the upper electrode of condenser 86 upon the movement of either tongue 85 or 84 of the dot and dash relays, respectively. Thus, upon the receipt of either a dot or dash, neutral is removed from lead 87 and the full positive voltage appearing at the upper end of resistance 88 is applied to the upper electrode of condenser 86 and causes a positive pulse to be passed to the control electrode of tube 87*a*, which is sufficient to overcome the negative bias thereon and causes tube 87*a* to conduct.

Figure 4A:
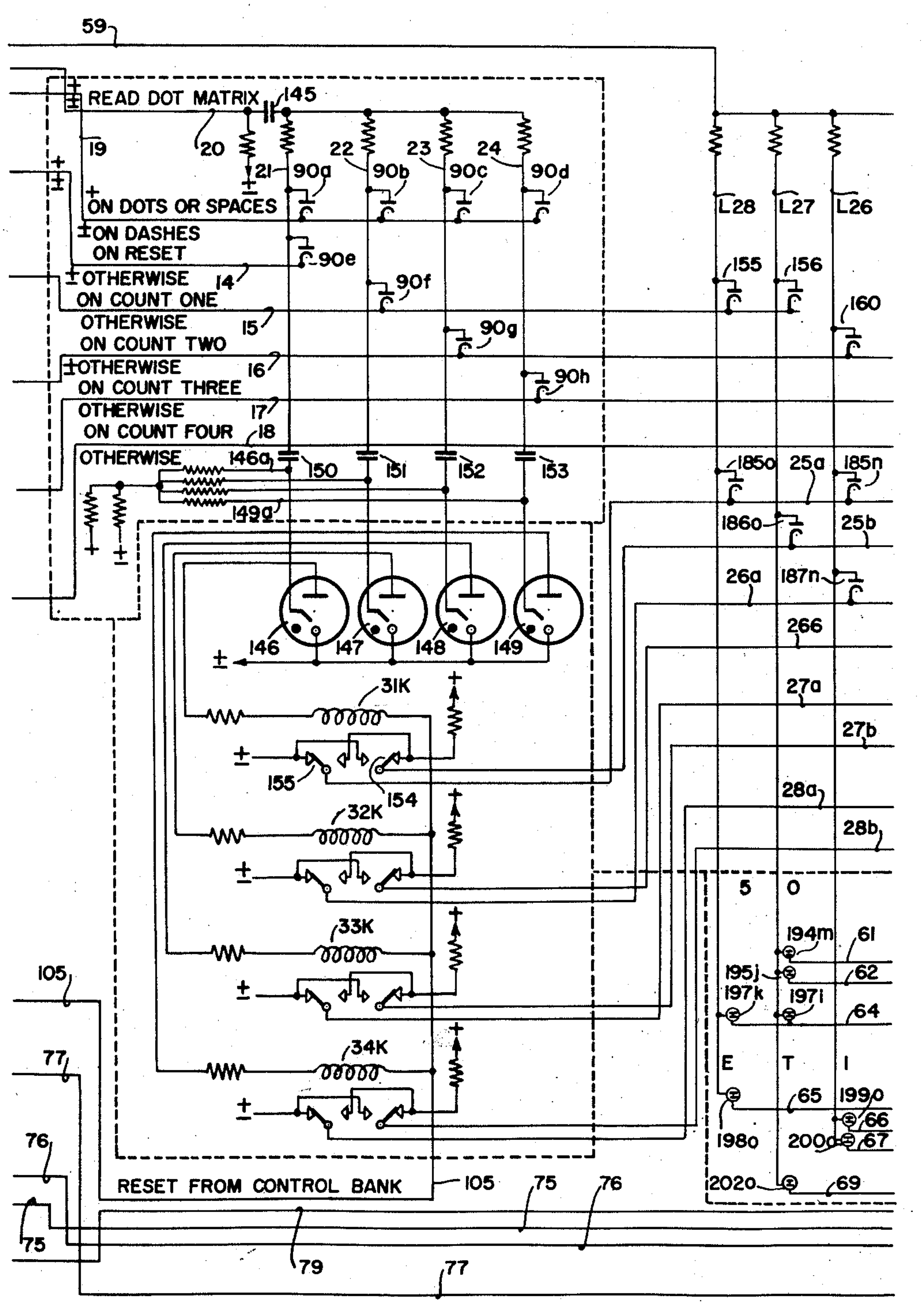
Fig. 4A is a schematic circuit diagram of the Dot Matrix, the Dot/Dash Storage Bank and a first portion of the Conversion Matrix of Fig. 2A, and a first portion of the 5-Unit Coupling Matrix of Fig. 2B.
Figure 4B:
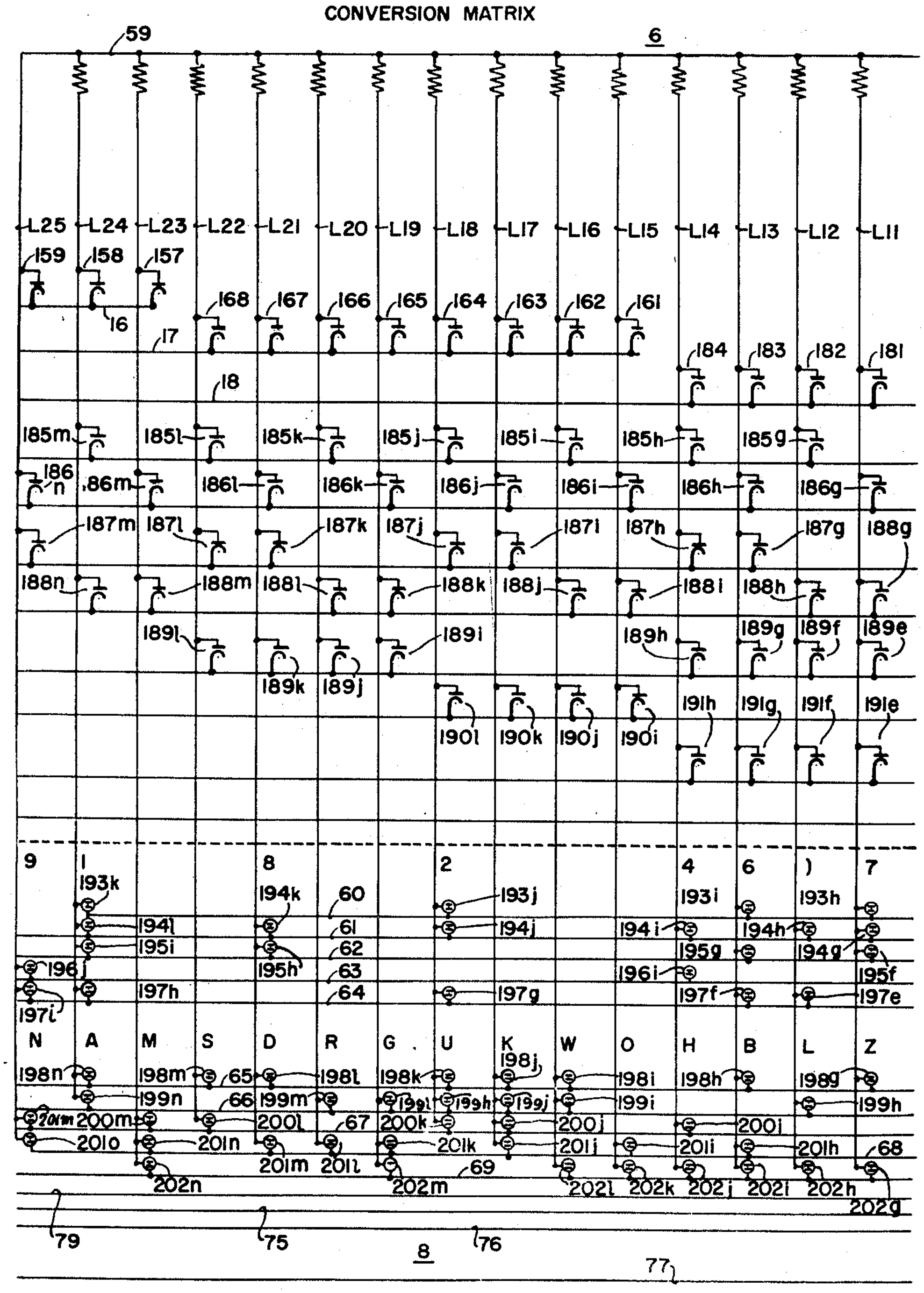
Fig. 4B is a schematic circuit diagram of a second portion of the Conversion Matrix of Fig. 2A, and a second portion of the 5-Unit Coupling Matrix of Fig. 2B.
Figure 4C:
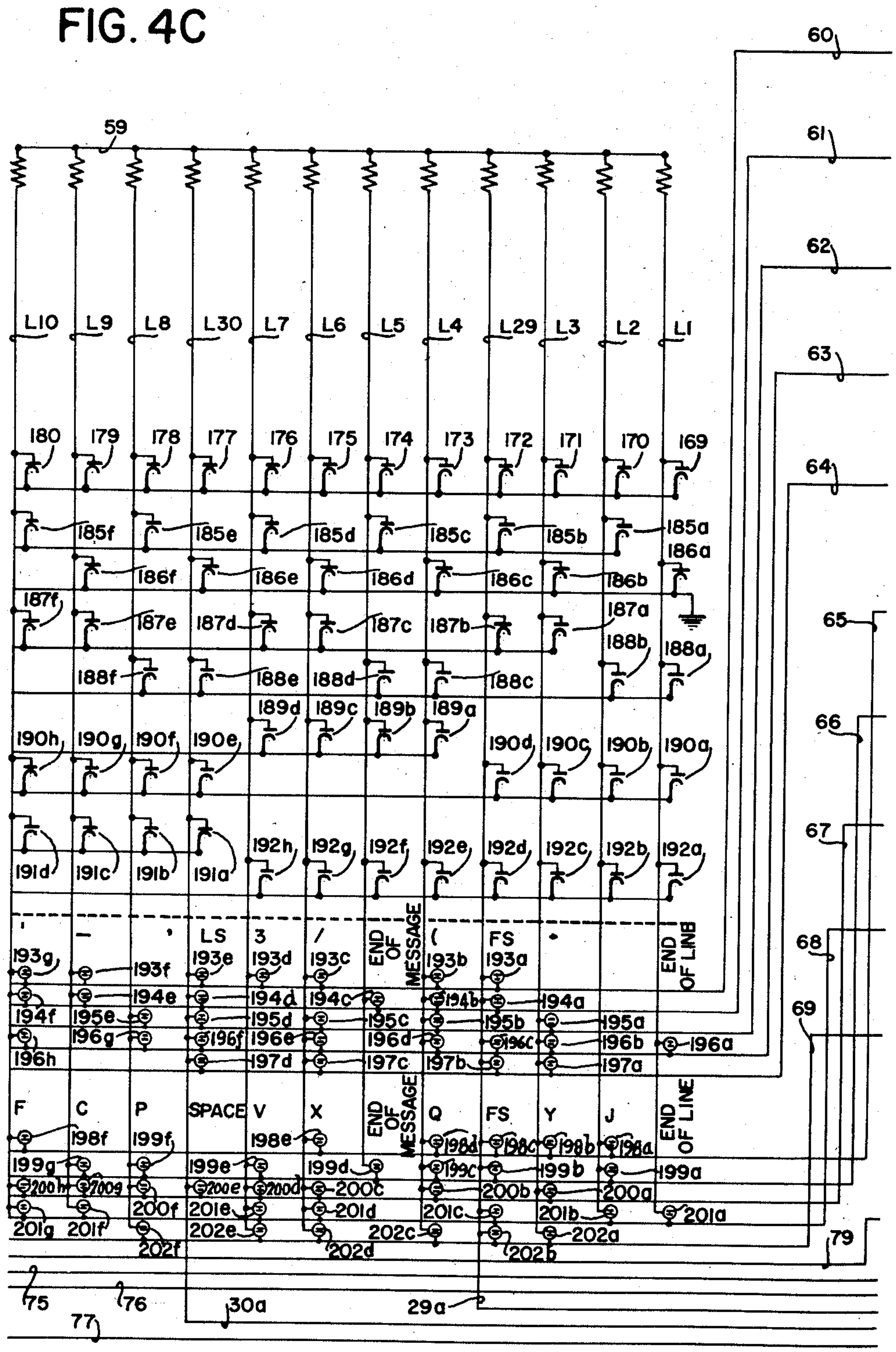
Fig. 4C is a schematic circuit diagram of a third portion of the Conversion Matrix of Fig. 2A and a third portion of the 5-Unit Coupling Matrix of Fig. 2B.

The front contact 84*b* associated with tongue 84 of the dash relay 2K is connected to lead 19, which lead is connected in Fig. 4A to one terminal of a group of unidirectional current conducting elements 90*a* . . . 90*d* in the Dot Matrix 4, and the other terminals of which devices are connected to leads 21 . . . 24, respectively. It will be noted that a positive potential is normally applied to lead 19 via resistance 91 (Fig. 3A), and it will be understood that when the tongue 84 of the dash relay is moved to its front contact 84*b*, that neutral potential will be applied to the lead 19 and that a voltage drop will occur across resistance 91. Thus, positive potential will be applied to lead 19 during space intervals and during the receipt of dot signals, but lead 19 will be at neutral potential during the receipt of dash signals. Therefore, elements 90*a* . . . 90*d* will act as gates which are closed only when dots or spaces are being received and are open when dashes are received.

The anode of tube 87*a* is fed from a positive source through the winding of relay 3K and relay 3K will operate only when tube 87*a* conducts. Condenser 86, tube 87*a* and relay 3K may be considered as a Pulse Generator 1A whose function will be described later. The tongue 92 of relay 3K is connected to positive potential and cooperates with a pair of front contacts 93 and 94. Contact 93 is connected to lead 20 and contact 94 is connected to lead 12. A negative potential is normally applied to lead 12 via resistance 95. Lead 12 is connected to one electrode of a coupling condenser 96 (Fig. 3B) and to the anodes of a double diode 97 (Fig. 3A). The other electrode of condenser 96 is coupled to the Counting Bank 5 (Fig. 3B) over the tongue 97 of relay 25K.

The Counting Bank 5 consists of a chain of five thyratrons 98 . . . 102. The anode of thyratrons 98 is connected to positive potential via the winding of relay 21K, the back contact 103, and tongue 104 of relay 26K. The anodes of tubes 99 . . . 102 are serially connected to positive potential via windings of relays 22K . . . 25K respectively, via lead 105, back contact 106 and tongue 107 of relay 6K. The control electrode of thyratron 98 (which is the re-set tube of the counting bank 5), is coupled to a front contact of relay 6K via condenser 108 and lead 13 and is adapted to have a positive pulse applied thereto upon the energization of relay 6K. The relays 22K . . . 25K are of the double-pole, double-throw type, the right hand tongues of said relays being connected to leads 15 . . . 18 respectively. The right hand tongue of relay 22K is connected to one electrode of coupling condenser 109. The other electrode of condenser 109 is connected to the control electrode of electron discharge tube 110. The anode of tube 110 is connected to positive potential via the winding of relay 26K. The back contacts associated with the right hand armatures of relays 22K . . . 25K are each associated to neutral. The front contacts of each of the aforementioned relays are connected to positive potential. The left-hand armature and cooperating contact sets of the relays 22K . . . 25K are connected as follows:

The back contact 111 associated with relay 22K is connected to the control electrode thyratron 99 and the front contact 112 is connected to the control electrode of thyratron 100. The relay tongue associated with contacts 111 and 112 is connected to the back contact 113 of relay 23K. The corresponding tongues of relays 23K and 24K are similarly connected to the back contacts of the next succeeding relay, and the corresponding tongue of relay 25K is connected to condenser 96. The left set of front contacts of relays 23K and 24K are connected to the control electrodes of thyratrons 101, 102, respectively. The cathode of thyratrons 98 and 102 are directly connected to neutral, but the cathodes of intervening thyratrons 99 . . . 101 are connected to the right-hand tongues associated with relays 23K . . . 25K, respectively.

Returning to the description of the Control Bank 1, the right-hand portion of double diode 97 (Fig. 3A), electron discharge tubes 114, 115 and relays 4K and 5K (Fig. 3B), tube 116, and relay 6K, constitute the Letter-Space Timing Circuit 1B. The left-hand portion of double-diode 97 (Fig. 3A), together with tubes 117, 118, relays 7K, 8K (Fig. 3B), 9K, 10K and 11K constitutes the Word-Space Timing Circuit 1C. The control electrode of tube 114 (Fig. 3A) in the Letter Space Timing Circuit 1B is normally biased negative by a variable resistance 119 having one end thereof connected to negative potential and which with condenser **121*a* comprising a first RC circuit. The control electrode of tube 117 in the Word-Space Timing Circuit 1C is similarly biased over variable resistance 120 with which is associated condenser 128, comprising a second RC circuit. The time constant of the circuit 1C is longer than that of circuit 1B. The cathodes of both tubes 114 and 115 are connected together and are held above neutral potential by means of common resistance 121. The right-hand cathode of double-diode 97 is coupled to the control electrode of tube 114 and is adapted to charge condenser 121*a*. Tube 115 is coupled to tube 114 over an obvious circuit which includes condenser 122. The windings of both relays 4K and 5K (Fig. 3B) are serially connected between the positive anode potential source and the anode of tube 115 and are adapted to operate when the tube 115 conducts. Relay 4K is provided with a tongue 123 which is connected to positive potential and which is adapted to apply positive potential to its cooperating front contact which, in turn, is connected to lead 59. It will be noted that there is a known form of RC network shunted across the relay tongue 123 and its front contact consisting of condenser 124 and resistance 125 and which is for the purpose of suppressing arcing at the contacts and forms no part of the invention per se. Similar arc suppressors will be found throughout the drawing and will not be further described. The tongue 126 associated with relay 5K is coupled to one electrode of storage condenser 127 and is adapted to apply positive potential thereto when relay 5K is energized and is further adapted to discharge condenser 127 into the control electrode circuit of tube 116 when relay 5K is de-energized. Relay 6K has its winding serially connected between positive anode supply and the anode of tube 116**.

Tube 117 of the Word-Space Timing circuit 1C has its control electrode coupled to the left-hand cathode of double-diode 97 and to one electrode of storage condenser 128. Tube 118 is coupled to tube 117 by a coupling condenser 129 and both tubes 117 and 118 have their cathodes connected together and held above neutral by means of common resistance 130. The winding of relay 7K is serially connected between positive anode supply and the anode of tube 118. The tongue of relay 7K is connected to storage condenser 131 and cooperates with a pair of front contacts 132 and 133, as well as with back contact **134*a*. Front contact 132 is connected to positive potential, and front contact 133 is connected to lead 79. The winding of relay 8K is serially connected between neutral and back contact 134*a* of relay 7K, and is adapted to be operated by the charge stored in condenser 131 when relay 7K de-energizes. Tongue 135 which cooperates with relay 8K has associated therewith front contact 136 and back contact 137 of which contact 136 is connected to positive potential and back contact 137 is connected to front contact 138 associated with relay 6K. The windings of relays 9K, 10K and 11K are serially connected between neutral and tongue 135 associated with relay 8K. Tongue 139 associated with relay 9K is connected to positive potential and is adapted to apply positive potential to lead 75 over its cooperating front contact 140. Tongue 141 associated with relay 10K is connected to positive potential and adapted to apply said potential to lead 76 over its cooperating back contact 142. Tongue 143 associated with relay 11K is connected to neutral and is adapted to apply said potential to lead 77 via its back contact 144**.

As shown in Fig. 4A, the Dot Matrix 4 consists of a first group of four vertical conductors 21 . . . 24, and a second group of five horizontal conductors 14 . . . 19.

As explained before, rectifiers **90*a* . . . 90*d* are coupled between lead 19 and leads 21 . . . 24, respectively. In addition, rectifier 90*e* is coupled between lead 21 and lead 14; rectifier 90*f* is coupled between lead 22 and lead 15; rectifier 90*g* is coupled between lead 23 and lead 16; and rectifier 90*h* is coupled between lead 24 and lead 17. Each of the leads 21 . . . 24 is coupled to the common lead 20 via coupling condenser 145. Leads 21 . . . 24 are severally coupled to the control electrodes of thyratrons 146 . . . 149 via individual coupling condensers 150 . . . 153**, respectively.

The thyratrons 146 . . . 149, together with their associated relays 31K . . . 34K constitute the Dot-Dash Storage Bank 7. The windings of relays 31K . . . 34K have a common connection to lead 105 and individual connections to the anodes of thyratrons 146 . . . 149, respectively. The cathodes of the said thyratrons have a common connection to neutral. The control electrodes of the said thyratrons are connected to an electrode of the coupling condensers 150 . . . 153, respectively, and are normally biased positively over individual bias resistors **146*a* . . . 149*a* to a positive potential of a value insufficient to cause conduction without the application of a positive pulse over the coupling condensers 150 . . . 153**.

Each of the relays 31K . . . 34K are of the double-pole, double-throw type and have their respective contacts coupled to neutral and positive sources of potential so that the back contact associated with the right-hand tongues of the relays, and the front contacts associated with the right-hand tongues of the relays are connected to positive potential. The right-hand tongue 154 associated with relay 31K is connected to lead **25*b* and the left hand tongue 155 associated with the same relay, is connected to lead 25*a*. Correspondingly, the tongues of the relays 32K . . . 34K are connected to the leads 26*a*, 26*b*; 27*a*, 27*b*; and 28*a*, 28*b***.

The Conversion Matrix 6 (Figs. 4A, 4B and 4C) comprises the vertical leads L1 . . . L30, and the horizontal leads 15 . . . 18 (which extend from the Counting Bank 5 and through the Dot Matrix 4), and the lead pairs **25*a*, 25*b*; 26*a*, 26*b*; 27*a*, 27*b*; and 28*a*, 28*b*. Lead 15 is coupled to leads L27 and L28 via rectifiers 155 and 156, respectively. Lead 16 is coupled to leads L23 . . . L26 via rectifiers 157 . . . 160, respectively. Lead 17 is coupled to leads L15 . . . L22 via rectifiers 161 . . . 168, respectively, and lead 18 is coupled to leads L1 . . . L14 and leads L29 and L30 via rectifiers 169 . . . 184**.

Lead **25*a* is coupled to the even numbered leads L2 . . . L28, and L29 via separate rectifiers 185*a* . . . 185*o*. Lead 25*b* is coupled to the odd number leads L1 . . . L27 and L30 via separate rectifiers 186*a* . . . 186*o*. Lead 26*a* is coupled to alternate pairs of leads L3, L29, L6, L7, L9, L10, etc., via rectifiers 187*a* . . . 187*n*. Lead 26*b* is coupled to intervening pairs of lead L1, L2, L4, L5, L30, L8, L11, L12; etc., via separate rectifiers 188*a* . . . 188*n*. Lead 27*a* is coupled to leads L4 . . . L7; L11 . . . L14; and 119 . . . L22 via seprate rectifiers 189*a* . . . 189*l*. Lead 27*b* is coupled to leads L1 . . . L3, L29, L30, L8 . . . L10, L15 . . . L18 via separate rectifiers 190*a* . . . 190*l*. Lead 28*a* is coupled to leads L30, L8 . . . L14 via separate rectifiers 191*a* . . . 191*h*; and lastly, lead 28*b* is coupled to leads L1 . . . L3, L29, L4 . . . L7 via separate rectifiers 192*a* . . . 192*h***.

The Five-Unit Coupling Matrix 8 consists of two groups of five leads 60 . . . 64 and 65 . . . 69 and is coupled to leads L1 . . . L30 of the Conversion Matrix 6 as follows:

Lead 60 is coupled to leads L29, L4, L6, L7, L30, L9 . . . L11, L13, L18 and L24, via separate gaseous discharge devices **193*a* . . . 193K. Lead 61 is coupled to leads L29, L4, L5, L30, L9 . . . L12, L14, L18, L21, L24 and L27**, via separate gaseous discharge devices 194*a* . . . 194*m*. Lead 62 is coupled to leads L3, L4, L6, L30, L8, L11, L13, L21, L24 and L27 via separate gaseous discharge devices 195*a* . . . 195*j*. Lead 63 is coupled to leads L1, L3, L29, L4, L6, L30, L8, L10, L14 and L25 via separate gaseous discharge devices 196*a* . . . 196*j*. Lead 64 is coupled to leads L3, L29, L6, L30, L12, L13, L18, L24, L25, L27 and L28, via separate gaseous devices 197*a* . . . 197*k*.

The coupling between the matrices just described covers the output for "figure" case elements. The coupling between said matrices to be now described covers the output for "letter" case elements. Lead 65 is coupled to leads L2, L3, L29, L4, L6, L10, L11, L13, L16 . . . L18, L21, L22, L24 and L28 via separate gaseous devices 198*a* . . . 198*o*. Lead 66 is coupled to leads L2, L29, L4, L5, L7, L8, L9, L12, L16 . . . L20, L24 and L26 via separate gaseous discharge devices 199*a* . . . 199*o*. Lead 67 is coupled to leads L3, L4, L30, L6 . . . L10, L14, L17, L18, L22, L23, L25, L26 via separate gaseous discharge devices 200*a* . . . 200*o*. Lead 68 is coupled to leads L1, L2, L29, L6, L7, L9, L10, L13, L15, L17, L19 . . . L21, L23 and L25 via separate gaseous discharge devices 201*a* . . . 201*o*, and finally, lead 69 is coupled to leads L3, L29, L4, L6, L7, L8, L11 . . . L16, L19, L23 and L27 via gaseous discharge devices 202*a* . . . 202*o*.

The output leads 60 . . . 64 and 65 . . . 69 from the Five-Unit Coupling Matrix 8, are coupled to the Output Relay Bank 9 (Figs. 5A and 5B) which comprises two groups of thyratrons 203 . . . 207 and thyratrons 208 . . . 212, being coupled to the control electrodes of said groups of thyratrons via condensers 213*a* . . . 213*j*, respectively. It will be noted that the anodes of corresponding thyratrons in the two groups are connected together by a common connection, thus the anode of thyratron 203 is connected to the anode of thyratron 208, and the anode of thyratron 204 is connected to the anode of thyratron 209, etc. The paired anodes of the two groups are coupled, respectively, to lead 76 via the windings of relays 217K . . . 221K, respectively.

*Operation*

For the sake of clarification, it will be assumed that the letters "RN" will be received in cable code and converted into Baudot code in the ensuing explanation. It will be further assumed that the interval between successive Cable Code elements is forty milliseconds; that the spacing between letters is similarly forty milliseconds and that the spacing between words is an additional eighty milliseconds.

The incoming Cable Code signals which are either positive or negative, depending upon whether they are dot or dash signals, cause either the dot or dash relays 1K or 2K to operate and as a result of which operation, pulse generator 1A delivers three simultaneous, outgoing pulses; the first, via lead 20 to the Dot Matrix 4, the second, to the Counting Bank 5 via lead 12 and the third to the Letter-Space Timing Circuit 1B and to the Word-Space Timing Circuit 1C. Upon receipt of the first pulse by the Counting Bank 5, thyratron 99 is caused to conduct and its associated relay 22K thereupon operates and performs three functions, first by means of its right-hand tongue it applies positive potential to lead 15; second, it applies a positive triggering pulse to tube 110, and thirdly by means of its left-hand tongue is prepares the next thyratron 100 in the chain for firing upon the receipt over lead 12 of the next generated pulse which will be received from the Pulse Generator 1A, upon the incoming of the next Cable Code element. Tube 110 conducts and its associated relay 26K removes positive potential from the anode of thyratron 98 which is in a normally conducting condition prior to the receipt of the first signal element. The positive potential on lead 15 blocks rectifier 90*f* in the Dot Matrix 4 (Fig. 4A). A positive potential is present on lead 19 at all times except when a dash is being received by the dash relay 2K and, therefore, rectifiers 90*a* . . . 90*d* are blocked except when the dash is being received, at which time neutral is applied to lead 19.

Upon receipt of the first dot of the letter "R," therefore, positive potential appears on lead 19 (indicating that a dot or space is being received in Cable Code). Positive potential also appears on lead 14 because thyratron 98 is initially conducting and has not yet been extinguished by receipt of the first generated pulse. Therefore, rectifier 90*e* as well as 90*a* is blocked and the positive pulse which is applied to lead 20 by the Pulse Generator 1A causes the triggering of thyratron 146 in the Dot/Dash Storage Bank 7. Relay 31K associated with thyratron 146 becomes energized and remains in that condition until anode potential is removed from thyratron 146 in a manner to be later explained. Thus, after the receipt of the first dot of the Cable Codeletter "R," relay 31K is operated and applies positive potential to lead 25*a* and neutral potential to lead 25B, both of which are leads extending into the Conversion Matrix 6. The second Cable Code element of the letter "R" is a dash and is a negative pulse when applied to the terminals 2, 3 and, therefore, causes dash relay 2K to operate. Again three pulses are derived from the Pulse Generator 1A but now neutral potential is present on lead 19 extending into the Dot Matrix 4 because the tongue 84 of relay 2K now applies neutral to lead 19. The read pulse, which is applied to lead 20 will now be unable to trigger thyratron 147 in the Dot-Dash Storage Bank 7 since the rectifier 90*b* absorbs any such pulse via lead 19, tongue 84, contact 84*b* and neutral. In the meantime, however, thyratron 100 in the Counting Bank 5 operated in response to the second impulse received from the pulse generator 1A and positive potential is applied to lead 16, and also to the cathode of fired thyratron 99 causing it to extinguish and restoring neutral potential to lead 15. Relay 2K de-energizes, neutral is removed from lead 19 and positive potenial via resistance 91 is applied thereto. The third and last Cable Code element consisting of the final dot in the letter "R" is now received over the terminals 2, 3 and causes the dot relay 1K to re-operate the Pulse Generator 2, 3 and causes the dot relay 1K to re-operate the Pulse Generator 1A. Positive potential is again applied to lead 19 since the neutral has been removed therefrom the dash relay 2K now being de-energized. Both rectifiers 90*c* and 90*g* in the Dot Matrix are blocked and a positive pulse on lead 20 will cause thyratron 148 to trigger in the Dot-Dash Storage Bank, thereby causing positive potential to be applied to lead 27*a* and neutral potential to be applied to lead 27*b*. The pulse derived from Pulse Generator 1A advances the count in the Counting Bank 5 so that now thyratron 101 conducts and by means of its associated relay 24K applies positive potential on lead 17.

At the conclusion of the Cable Code Elements constituting the letter "R" the following conditions are present:

(1) Positive potential appears on lead 17 since thyratron 101 remains fired and its associated relay 24K remains energized;

(2) Positive potential appears on lead 25*a* since thyratron 146 remains fired and its associated relay 31K remains energized;

(3) Positive potential appears on lead 26*b* since thyratron 147 remains unfired and its associated relay 32K is in the de-energized position, and (4) Positive potential appears on lead 27*a* since thyratron 148 remains fired and its associated relay 33K remains energized.

Figure 5A:
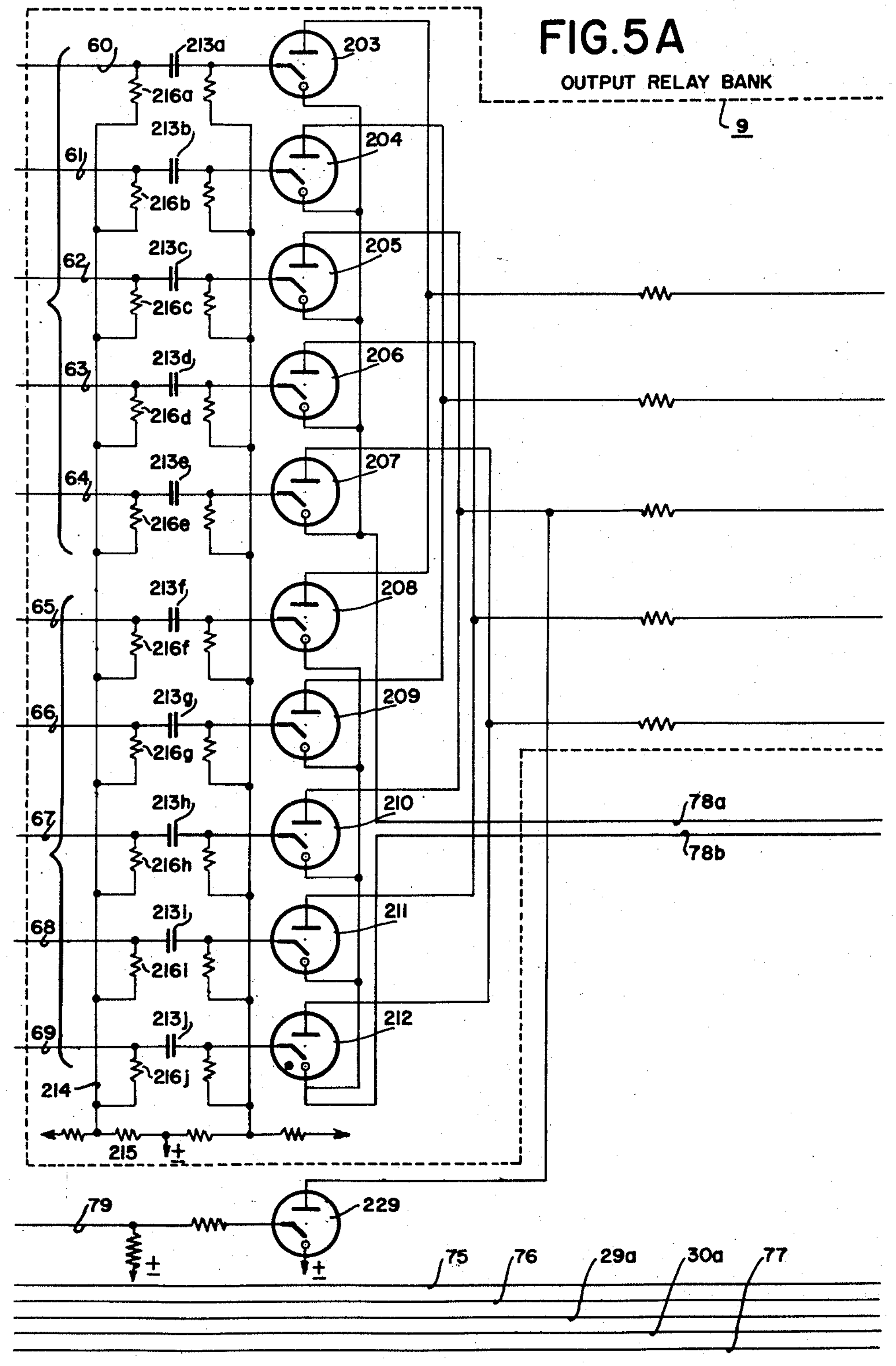
Fig. 5A is a schematic circuit diagram of a first portion of the Output Relay Bank of Fig. 2B.
Figure 5B:
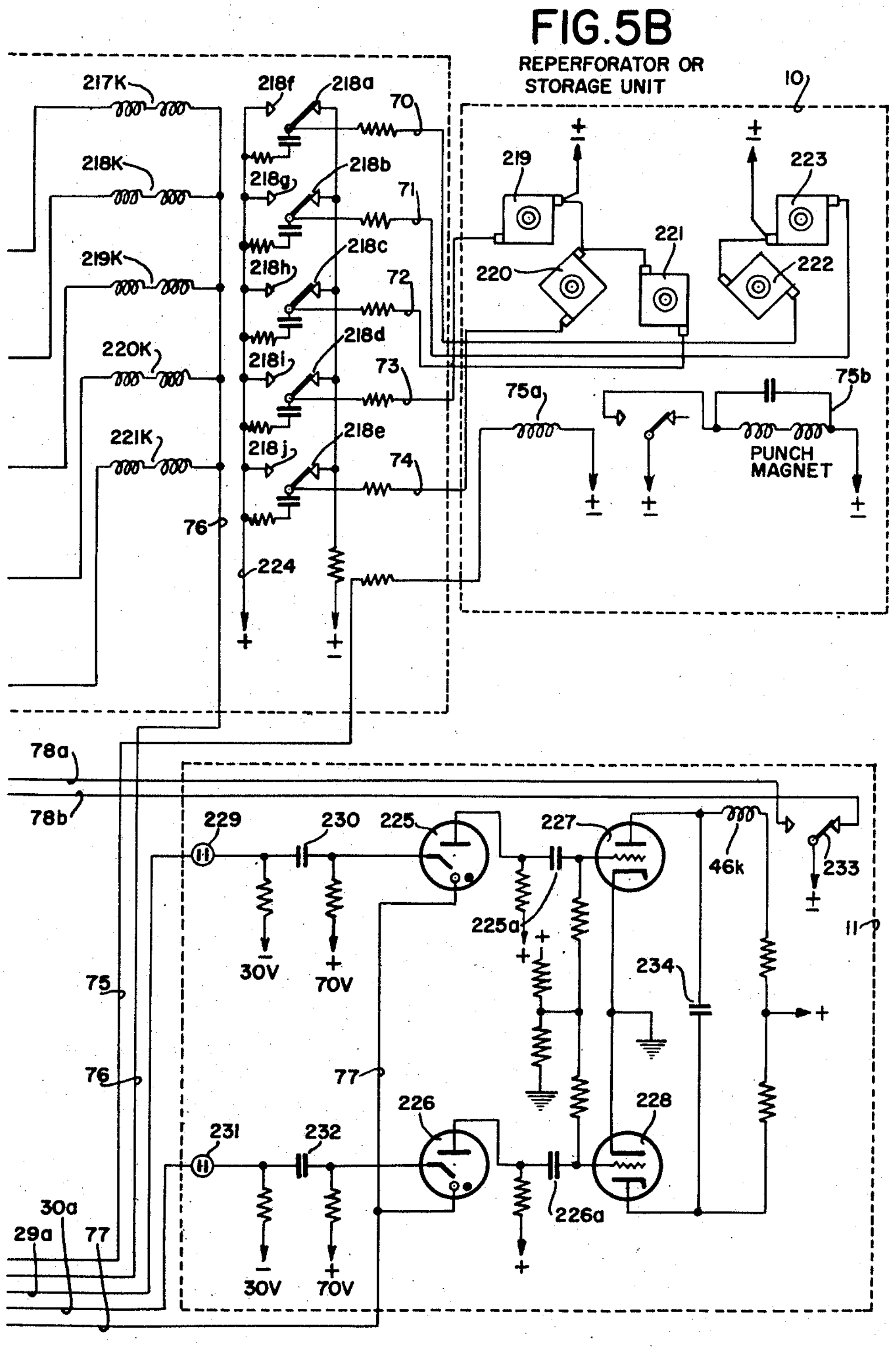
Fig. 5B is a schematic circuit diagram of the other portion of the Output Relay Bank and of the Reperforator or Storage Unit and Shift Storage Circuit, all of Fig. 2B.

(5) A positive pulse is derived from the Letter-Space Timing Circuit 1B, over lead 59 approximately 64 milliseconds after receipt of the last Cable Code element but finds blocked the rectifier 166 coupled between lead 17 and lead L20 in the Conversion Matrix; it also finds blocked the rectifiers 185*k*, 188*l* and 189*j*, and consequently the pulse will pass to leads 66 and 68 of the Five-Unit Coupling Matrix 8 via the neon lamps 199*m* and 201*l*. A negative potential is normally applied to each of the leads 60 . . . 69 via common lead 214 which is connected to voltage divider 215 (Fig. 5A). The positive pulse over lead L20 causes ionization of the neon lamps last mentioned above and thereby causes positive pulses to be applied to thyratrons 209 and 211 in the Output Relay Bank 9 via coupling condensers 213*g* and 213*i*, respectively, and which thyratrons thereupon trigger and cause the energisation of their associated relays 218K and 220K, respectively. Selector magnets 223 and 219 are thereupon actuated due to the application of positive potential thereto by the tongues associated with said relays. A further pulse whose derivation will be later explained causes the punch magnet 75*b* to operate selector magnets 233 and 219 the operation of which corresponds to the Baudot code permutation representative of the letter "R."

While the counting of pulses was taking place in the Counting Bank 5, the Letter-Space Timing Circuit 1B was kept from operating so long as successive Cable Code signal elements were being received at regular intervals of about 40 milliseconds. After a time period approximately equal to one and one-half letter spaces or 60 milliseconds after the receipt of a code element, tube 114 in the Letter-Space Timing Circuit 1B cuts off and thereby applies a positive pulse to tube 115 via condenser 122 causing the conduction of tube 115 for a period of a few milliseconds. Relay 4K associated with tube 115 thereupon energizes and causes the production of the positive pulse for a few milliseconds over lead 59 which is applied to the Conversion Matrix 6. At the end of this brief period, relay 5K de-energizes and applies a positive pulse stored in condenser 127 to the control electrode of tube 116 which thereupon conducts and thereby results in the energization of relay 6K and the consequent application thereby of a positive pulse via lead 13 to the control electrode of the re-set thyratron 98 in the counting Bank 5, causing it to conduct and to re-apply positive potential on lead 14. Relay 6K also disconnects anode potential from common lead 105 which leads to the anodes of the chain of thyratrons 99 . . . 102 thereby extinguishing the lastly fired one in the chain. If the code element following the letter space is a dot, positive potential will again be present on lead 19 and the rectifiers 90*a* and 90*e* will be blocked and thyratron 146 may again be triggered upon the receipt of the pulse via lead 20 from circuit 1A. The operation of relay 6K also controls the application of a positive potential via lead 75 to the punch magnet control relay 75*a*, 75*b*, since the operation of relay 6K controls the operation of relays 9K, 10K and 11K via its front contact 138, lead 75*c*, back contact 137 and tongue 135 of relay 8K. The energization of relay 6K also removes positive potential from lead 105 which is coupled in parallel to the anodes of thyratrons 146 . . . 149 in the Dot-Dash Storage Bank 7 thereby extinguishing any of said tubes which were conducting and conditioning them for re-operation. The operation of relay 11K removes neutral from lead 77 and thereby extinguishes either of the thyratrons 225, 226 in the shift Storage Circuit 11, the operation of which circuit will be later explained.

The operation of the Word-Space Timing Circuit 1C will now be explained. After a time period approximately equal to three and one half letter spaces or 140 milliseconds, tube 117 will cut off due to the time-constant of condenser 128 and potentiometer 120 which are so arranged that the charge on condenser 128 decays and the grid of tube 117 thereupon goes negative and cuts the tube off. Upon the cut-off of tube 117, tube 118 will conduct for a few milliseconds and causes relay 7K to pulse briefly. Relay 7K performs two functions, the first being the application of positive potential to lead 79 by the electrical connection of front contacts 132 and 133 by the movement of tongue 134 of said relay and also the charging of condenser 131 connected to said tongue. The positive voltage applied to lead 79 triggers thyratron 229 in the Output Relay Bank 9 (Fig. 5A). Thyratron 229 has its anode connected serially through relay 219K (Fig. 5B) to lead 76. When relay 7K de-energizes, the stored charge in condenser 131 causes the momentary operation of relay 8K, which results in the application by tongue 135 of relay 8K of a momentary positive pulse to relays 9K, 10K, and 11K, resulting in the application of positive potential to lead 75 by the tongue 139 of relay 9K and which operates the punch magnet control relay 75*a*. Since only relay 219K in the Output Relay Bank 9 operated, selector magnet 221 in the Reperforator 10 is the only one which will perforate a tape (not shown). Selector magnet 221 corresponds to the third Baudot code element and, therefore, the Reperforator delivers a permutation — — + — — (minus, minus, plus, minus, minus) and which corresponds to the Baudot code element for "Word Space."

The Five-Unit Coupling Matrix 8 consists of two groups of five leads 60 . . . 64 and 65 . . . 69 which are coupled to the Conversion Matrix 6 by means of gaseous discharge devices 193*a* . . . 202*o*. The vertical leads L1 . . . L30 of the Conversion Matrix 6 and the two groups of five leads 60 . . . 64 and 65 . . . 69 of the Coupling Matrix 8 constitutes a rectangular network; the gaseous discharge devices being disposed throughout the networks in accordance with the Baudot code and adapted to apply a positive potential on given of the groups of five leads in accordance with said code. Specifically, the first group of five leads represented by conductors 60 . . . 64 with the several gaseous discharge devices which may be, for instance, neon lamps and bearing reference numerals 193*a* . . . 197*h*, representing the "figure" case. Conductors 65 . . . 69, together with associated gaseous discharge devices 198*a* . . . 202*o*, represent the "letter" case. The permutations of the neon lamps will be found to agree with the permutation of the Conversion Code as shown in Fig. 1. Thus, for instance, for the Baudot Code representing the numeral "1," the code permutation will be seen to be + + + — +. Upon referring to Fig. 4B, it will be seen that the numeral "1" is derived from the coupling between lead L24 and the leads 60, 61, 62 and 64. There will be observed neon lamps 193*k*, 194*l*, 195*i* and 197*h*, coupling lead L24 with leads 60, 61, 62 and 64, respectively. It will be noted, however, that there is no coupling between lead L24 and lead 63. This lack of coupling means that no positive potential may be ever derived from lead L24 on lead 63. Lead 63 is the fourth lead of the group of five and corresponds to the fourth permutable code element and which upon reference to Fig. 1 will be seen to be a negative sign.

The same lead L24 of the Conversion Matrix 6 is coupled to the second group of leads 65 . . . 69 in the coupling matrix for the formation of the letter "A" in the "letter" case. It will be seen that there are neon lamps 198*n* and 199*n* coupling lead L24 to leads 65 and 66 respectively. This will assure a positive potential on leads 65 and 66 when lead L24 is energized in the Conversion Matrix. It will be further observed that there is no coupling whatever between lead L24 and leads 67 . . . 69. Thus, again referring to Fig. 1, we note that the permutable elements for the letter "A" in Baudot code is + + — — —. Upon tracing the connection of the several leads 60 . . . 69 over into the Output Relay Bank 9 (Fig. 5A), it will be seen that each of the leads 60 . . . 69 is connected to a negative potential via common lead 214 and voltage divider 215, via individual limiting resistors 216*a* . . . 216*j*. When the Conversion Matrix 6 is at neutral potential, there is a potential difference across each of the neon lamps of the value of 30 volts, which is insufficient potential to cause breakdown between the electrodes in said lamps. When, however, a positive "read" pulse is received from the Letter-Space Timing Circuit 1B over the lead 59, the amplitude of the "read" pulse is such as to be capable of causing ionization of any group of neon lamps coupled to leads L1 . . . L30 of the Conversion Matrix, which is not connected to neutral by reason of the potential applied thereto by the Dot/Dash storage Bank 7 or by the Counting Bank 5. Upon the conduction of any of the neon lamps, the positive pulse is applied through the particular coupling condenser 213*a* . . . 213*j* which couples the several leads 60 . . . 69 to the control electrodes of a series of thyratrons 203 . . . 212 and which are part of the Output Relay Bank 9. The thyratrons 203 . . . 207 respond to "figure" case signals and the thyratrons 208 . . . 212 respond to signals in the "letter" case. It will be noted that the anodes of corresponding thyratrons 203 . . . 212 in the two groups are connected together. Each pair of thyratrons is coupled to lead 76 through the windings of relays 217K . . . 221K, (Fig. 5B) respectively. It will be seen that lead 76 has a positive potential applied thereto via back contact 142 and tongue 141 of relay 10K (Fig. 3B) and consequently relays 217K . . . 221K may be operated only when relay 10K is de-energized. Each of the relays 217K . . . 221K is provided with an associated tongue 218*a* . . . 218*e* respectively, respective of which tongues are connected to one terminal of a group of five selector magnets 219 . . . 223, and each of which represent one code element of the Baudot code. Each of said selector magnets have another terminal connected to neutral. When any one of the Output Relay Bank relays 217K . . . 221L is energized, its associated tongue moves to the front contact 218*f* . . . 218*j*, which front contacts are connected to a common lead 224, which, in turn, is connected to positive potential. As is well known, the selector magnets upon energization, move fingers in proximity to a tape and upon the operation of a punch magnet such as 75*b*, the appropriate perforations are made in the tape. It will be understood that since the selected thyratrons in the Output Relay Bank 9 remain fired until operation of the Letter-Space Timing Circuit 1B, or the Word Space Timing Circuit 1C, the selector magnets will be set in accordance with the five permutable code elements of the Baudot code and the punch magnet 75*a* will operate upon receipt of the sixth pulse derived from either the timing Circuit 1B or 1C.

The Shift Storage Circuit 11 (Fig. 5B) consists of two pairs of thyratrons 225, 226 and 227, 228. Thyratron 225 has an input circuit including neon lamp 229 and coupling condenser 230, and which circuit is serially disposed between lead 29*a* from the Conversion Matrix 6 and the control electrode of thyratron 225. The Shift Storage Circuit in effect, determined which group of leads 60 . . . 64, or 65 . . . 69 in the Coupling Matrix 8 will be effective since all the neon lamps associated with a given lead L1 . . . L30 and both groups of leads 60 . . . 64 and 65 . . . 69 will conduct upon receipt of the read pulse derived via lead 59 and by alternatively conditioning either group of thyratrons 203 . . . 207 and 208 . . . 212 it is determined whether a figure or its corresponding character shall be printed or punched on tape. Thyratron 225 of the Shift Storage Circuit has a similar input circuit including neon lamp 231 and coupling condenser 232 coupling the control electrode thereof to lead 30*a*. The anode of thyratron 225 is coupled to the control electrode of thyratron 227 via coupling condenser 225*a* and the anode of thyratron 226 is similarly coupled to thyratron 228 via condenser 226*a*. The cathodes of both thyratrons 225, 226 are connected to lead 77 which is at neutral when relay 11K is de-energized in the Word-Space Timing Circuit 1C. The anode of thyratron 227 is coupled to positive potential via the winding of relay 46K so that when thyratron 227 conducts, relay 46 K energizes and shifts its tongue 233 to its make contact which is connected to lead 78*a*. Neutral is applied via tongue 233 to the cathodes of thyratrons 203 . . . 207 when relay 46K is energized and when relay 46K is de-energized neutral is applied to the cathodes of thyratrons 208 . . . 212. Condenser 234 coupled between the anodes of thyratrons 227 and 228 serves to cut off a conducting thyratron 227, 228 upon the triggering of the other. Thus relay 46K determines which group of thyratrons 203 . . . 207 and 208 . . . 212 will be fired.

It will be appreciated that by suitably altering the Coupling Matrix 8, the Output Relay Bank 9, and the Reperforator or Storage Unit 10, a different code may be utilized for the output or "converted" code. Thus if the Coupling Matrix included two groups of seven leads and the Output Relay Bank included two groups of seven thyratrons and associated relays, and the Reperforator included seven selector magnets, conversion could be had to the seven-element code.

A different input code may also be catered for by suitably increasing, or diminishing, the stages of the counting chain in the Counting Bank 5 and the storage elements in the Dot/Dash Storage Bank 7.

While we have described above the principles of our invention in connection with specific apparatus it is to be clearly understood that this description is made only by way of example and not as a limitation to the scope of our invention as set forth in the objects thereof and in the accompanying claims.

What is claimed is:

1. A telegraph code converter for converting signals received in a first code into signals of a second code comprising receiving means for receiving first signal elements in a first code, said first signal elements having different characteristics, signal generating means coupled to said receiving means for generating second signal elements under control of said receiving means, said second signal elements having uniform characteristics, counting means coupled to said generating means for counting said second signal elements, first combining means coupled to said counting means and said receiving means for combining said counted signal elements with each received first signal element, said first combining means under joint control of said receiving means and said generating means, first storage means coupled to said first combining means for storing the combined information derived from said first combining means, second combining means coupled to said first storage means and said counting means for combining the final count in said counting means with the information stored in said first storage means under control of said generating means, second storage means for storing information in said second code, translating circuit means coupled intermediate said second combining means and said second storage means for producing an output in said second code under control of said second combining means in response to each combined item of information received from said second combining means, and utilization means coupled to said second storage means and said generating means adapted to respond to second code output of said second storage means under control of said generating means.

2. A telegraph converter as claimed in claim 1, wherein said receiving means comprise a dot relay and a dash relay, each relay having an operating winding and a biasing winding, said biasing windings serially connected and adapted to be coupled to a source of biasing potential, said operating windings serially connected in opposition and adapted to be selectively energized by said received first signal elements, each of said relays having a tongue and cooperating front and back contacts, the tongue associated with said dot relay connected to the front contact of said dash relay, the tongue associated with said dash relay connected to neutral potential, the back contact associated with said dot relay coupled to said signal generating means.

3. A telegraph converter as claimed in claim 1, wherein said signal generating means comprises a normally non-conducting amplifier, a pulsing relay coupled to said amplifier and adapted to be controlled thereby, said relay adapted to deliver an output pulse for each dot or dash relay signal received, said amplifier adapted to be rendered conducting upon the receipt of a dot or dash signal in said first code.

4. A telegraph converter as claimed in claim 3, wherein said signal generating means further comprises a pair of timing circuits of different time durations, each of said timing circuits coupled to said pulsing relay and under the control thereof, a first of said timing circuits adapted to deliver a first output pulse a predetermined time after the receipt by said receiving means of the last code element making up a letter and the other of said timing circuits adapted to deliver a second output pulse a predetermined time after the receipt by said receiving means of the last letter making up a word, said first pulse adapted to be applied to said second combining means, said second pulse adapted to be applied to said second storage means.

5. A telegraph converter as claimed in claim 4, wherein each of said timing circuits further comprises trigger means and pulse producing means under control of said trigger means, said pulse producing means adapted to produce said first and said second output pulses, respectively.

6. A telegraph converter as claimed in claim 1, wherein said counting means comprises a chain of gaseous discharge grid controlled devices, each device having an associated relay coupled in series with its discharge path, each of said associated relays having a pair of contact sets, one of said contact sets for applying a given potential to said first combining means and the other of said contact sets for coupling the next device in said chain to said generating means thereby to advance the count along said chain.

7. A telegraph converter as claimed in claim 6, wherein there is further provided counting chain reset means under control of said pulse generating means and coupled to said counting chain, said reset means adapted to reset said chain a predetermined time after the receipt by said receiving means of the last code element making up a letter.

8. A telegraph converter as claimed in claim 1, wherein said first combining means comprises a first rectifier matrix connecting said counting means to said first storage means, said matrix having a pair of inlets, one of said inlets coupled to said signal generating means and the other of said inlets coupled to said receiving means.

9. A telegraph converter as claimed in claim 1, wherein said first storage means comprises a plurality of two-position devices, selected of said devices adapted to change position upon receipt of output from said first combining means.

10. A telegraph converter as claimed in claim 9, wherein said two-position devices further comprise a plurality of thyratrons and a plurality of relays each having a winding and two sets of co-operating contacts, each of said thyratrons having a control electrode coupled to said first combining means and having the winding of one of said relays in the discharge path thereof, said first storage means further comprising a plurality of pairs of conductors, one conductor of each pair coupled to a different one of said contact sets, and a source of potential, the terminals of said source coupled to corresponding different ones of said contact sets whereby a first potential is applied to one conductor of a pair when its associated relay is in one position and is applied to the other conductor of said pair when said relay is in the other position.

11. A telegraph converter as claimed in claim 10, wherein said second combining means comprises a second rectifier matrix, said second matrix including a first group of conductors extending from said counting means and a second group of conductors comprised of said pairs of conductors extending from said first storage means, the rectifiers of said second matrix arranged in two groups, the first of said rectifier groups coupled to said first group of conductors in ascending binary series of from $2^0$ to $2^4$ order and the other of said rectifier groups coupled to said second group of conductors in ascending binary series of from $2^0$ to $2^3$ order.

12. A telegraph converter as claimed in claim 11, wherein said second rectifier matrix further comprises a first group of co-ordinate conductors coupled to said two other groups of conductors by means of said two groups of rectifiers and further coupled to said signal generating means and to said translating means.

13. A telegraph converter as claimed in claim 12, wherein said translating means comprises a second and a third group of coordinate conductors, one conductor in each of said second and third groups representing a code element in said second code, in the letter case and in the figure case, respectively, a plurality of switch elements each operable in response to a given value of voltage derived from one of said first group of conductors and one of said second or said third group of conductors.

14. A telegraph converter as claimed in claim 13, wherein said translating means further comprises a source of potential applied to said third group of coordinate conductors, said source of a polarity opposite to that applied to said first group of conductors by said signal generating means.

15. A telegraph converter as claimed in claim 13, wherein said switch elements comprise gaseous discharge devices arranged in code permutations corresponding to the elements of said second code.

16. A telegraph converter as claimed in claim 13, wherein said second storage means comprises two groups of switch devices, said groups coupled to said second and third groups of conductors, respectively, each conductor in said groups adapted to control operation of a different one of said switch devices.

References Cited in the file of this patent

UNITED STATES PATENTS

| | | |
|---|---|---|
| 2,534,387 | Thomas et al. | Dec. 19, 1950 |
| 2,534,388 | Shenk et al. | Dec. 19, 1950 |
| 2,621,250 | Spencer et al. | Dec. 9, 1952 |